Figure 1:
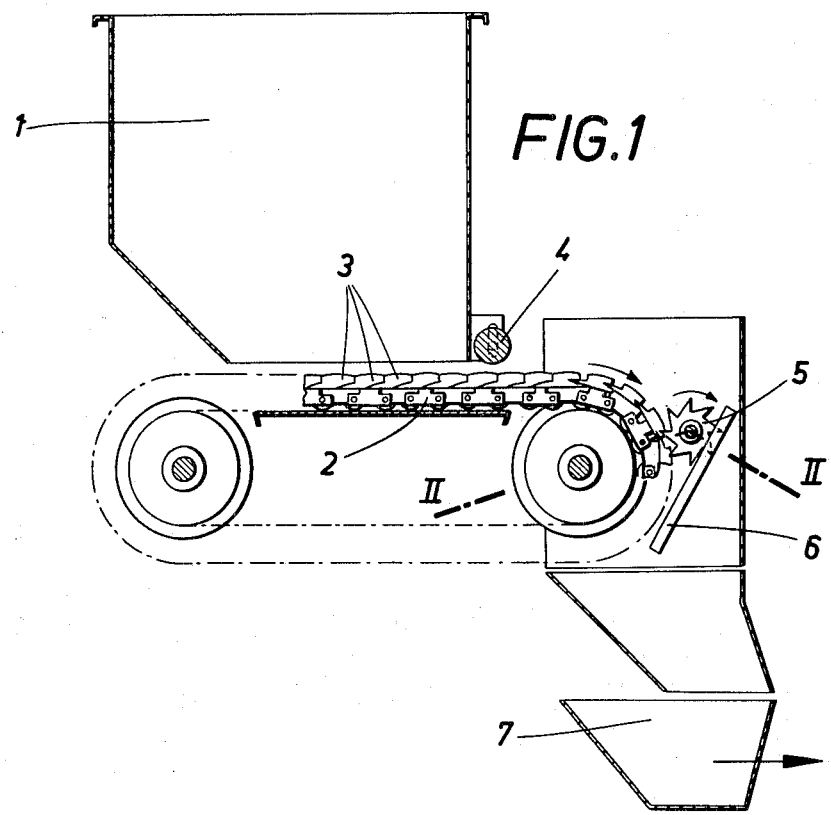

United States Patent

[11] 3,540,666

[72] Inventor Alois Altendorfer
Linz, Austria
[21] Appl. No. 708,609
[22] Filed Feb. 27, 1968
[45] Patented Nov. 17, 1970
[73] Assignee Vereinigte Osterreichische Eisen-und Stahlwerke Aktiengesellschaft
Linz, Austria
[32] Priority April 5, 1967
[33] Austria
[31] A 3,238/67

[54] APPARATUS FOR DISCHARGING AND DISINTEGRATING MATERIAL WHICH CAN BE PRESSED
5 Claims, 2 Drawing Figs.
[52] U.S. Cl. ................................................ 241/90, 241/223
[51] Int. Cl. .................................................... B02c 18/22
[50] Field of Search ........................................ 241/86, 88, 90, 158, 190, 223, 200, 236, 243

[56] References Cited
UNITED STATES PATENTS
1,618,721  2/1927  Norman .................... 241/200
1,877,320  4/1932  Holt .......................... 241/200X Primary Examiner—Robert C. Riordon
Assistant Examiner—Martin G. Raskin
Attorney—Kurt Kelman ABSTRACT: A discharge conveyor comprises a plate link belt having transversely spaced flights extending in the direction of travel of said belt. The belt has a receiving portion disposed under a storage bin and a delivery portion remote from said bin. A rotatable shaft extends transversely to the direction of travel of the belt near the delivery portion thereof and has generally radial projections, which extend into respective spaces between adjacent flights and are adapted to remove material from said spaces during a rotation of said shaft. A bar grate is disposed on the side of said shaft opposite to said belt and has bars which define spaces which receive said projections.

Patented Nov. 17, 1970

3,540,666

INVENTOR.
ALOIS ALTENDORFER
BY Kurt Kelman
AGENT

APPARATUS FOR DISCHARGING AND DISINTEGRATING MATERIAL WHICH CAN BE PRESSED

Difficulties are involved in the treatment of precrushed tar-dolomite compositions or the like because such compositions, which can be pressed, tend to cake and solidify and may become so hard even at room temperatures that they can hardly be disintegrated even by a heavy hammer gear. For this reason, the usual equipment is not suitable for a discharge of tar-dolomite compositions or the like from a storage bin.

It is known to provide a discharge conveyor belt under a storage bin. The usual conveyor belts cannot give a uniform flow of caking material and do not disintegrate the material. It is also known to provide in the bin itself a shaft which carries pins or knives and serves for agitating and mixing the stored material. Viscous compositions cannot be disintegrated in this manner within the bin.

It is an object of the invention to provide an apparatus which enables a discharge of material which can be pressed, particularly tar-dolomite compositions, from a storage bin without difficulty, a disintegration of said material and a delivery thereof in controlled quantities to a press or the like. Such apparatus should be simple in design and reliable in operation.

Based on an apparatus which comprises a discharge conveyor belt, which is disposed under the storage bin, this object is accomplished according to the invention in that the discharge conveyor belt consists of a plate link belt having flights which extend in the direction of travel, and a shaft which carries pins or knives and rotates in the sense of revolution of the link belt, which shaft is known per se, is disposed at the delivery end of the link belt and with its pins or knives enters between the flights and thereafter into the bar spaces of a bar grate, through which the disintegrated material falls into a press-charging car or the like. Material is carried along by the flights of the link belt and is thus discharged from the storage bin at the desired rate even when the material has caked. The pins or knives of the shaft lift the composition from the spaces between the flights and move it through the bar grate so that the material is subjected to a desired further disintegration before it reaches the charging car or the like.

In a development of the invention, a pressure roller is mounted on the discharge side of the storage bin over the link belt for upward and downward movement. That roller applies pressure to the discharged material so that the layer of material on the link belt is equalized.

Figure 2:
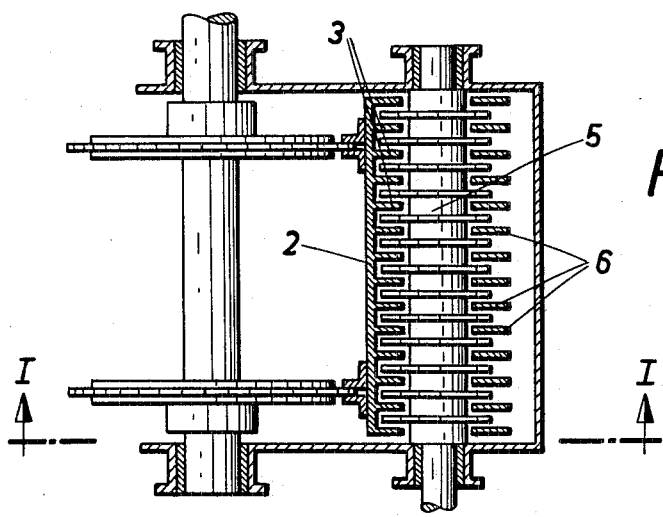

An embodiment of the invention is shown by way of example in the accompanying drawing, in which FIG. 1 shows a discharging and disintegrating apparatus in a sectional view taken on line I–I of FIG. 2 and FIG. 2 is an enlarged sectional view taken on line II–II of FIG. 1.

The storage bin 1 is filled with a precrushed tar-dolomite composition. A discharge conveyor belt consisting of a plate link belt 2 revolves under the storage bin 1 and is provided with flights 3, which extend in the direction of travel. A pressure roller 4 is mounted on the discharge side of the bin over the link belt 2 for up and down movement. A cutter shaft 5 is provided at the delivery end of the link belt 2 and with its knives enters between the flights 3 of the link belt 2 and into the bar spaces of a bar grate 6. The composition is disintegrated by the cutter shaft 5 in cooperation with the flights 3 of the link belt 2 and the grate 6 and falls into a charging car 7, by which the composition is supplied to a succeeding press, e.g. for pressing bricks for lining a converter.

I claim:

1. Apparatus for discharging and disintegrating material which can be pressed, said apparatus comprising:
   a storage bin;
   a discharge conveyor comprising a plate link belt having transversely spaced flights extending in the direction of travel of said belt;
   said belt having a receiving portion disposed under said bin and a delivery portion remote from said bin;
   a rotatable shaft extending transversely to the direction of travel of said belt near said delivery portion thereof and having generally radial projections which extend into respective spaces between adjacent flights and are adapted to remove material from said spaces during a rotation of said shaft;
   a bar grate disposed on the side of said shaft opposite to said belt and having bars which define spaces which receive said projections; and
   whereby material discharged from said bin and carried in said spaces between adjacent flights and removed by said projections is forced through said spaces between adjacent bars during a rotation of said shaft.

2. Apparatus as set forth in claim 1, in which said projections consist of knives.

3. Apparatus as set forth in claim 1, which comprises collecting means disposed below said grate and on the side thereof opposite to said shaft.

4. Apparatus as set forth in claim 3, in which said collecting means comprise a charging car.

5. Apparatus as set forth in claim 1, which comprises a pressure roller which is movable up and down and disposed over said link belt between said receiving and delivery portions thereof.